March 7, 1950 J. B. WALKER 2,499,895

MAGNETIC RECORDING APPARATUS

Filed Oct. 8, 1945 3 Sheets-Sheet 1

INVENTOR.
JOSEPH B. WALKER,
BY
Westall & Westall
ATTORNEYS.

March 7, 1950 J. B. WALKER 2,499,895

MAGNETIC RECORDING APPARATUS

Filed Oct. 8, 1945 3 Sheets-Sheet 2

INVENTOR.
JOSEPH B. WALKER,
BY
Westall & Westall
ATTORNEYS.

INVENTOR.
JOSEPH B. WALKER,
BY
Westall & Westall
ATTORNEYS.

Patented Mar. 7, 1950

2,499,895

UNITED STATES PATENT OFFICE 2,499,895

MAGNETIC RECORDING APPARATUS

Joseph B. Walker, Hollywood, Calif.

Application October 8, 1945, Serial No. 620,920

7 Claims. (Cl. 179—100.2)

This invention relates to magnetic recording apparatus which embodies a tape magazine adapted to house a pair of rotatable spools between which a considerable length of steel tape or wire may be carried for transferal from one spool to the other through a structurally separate magnetic unit operable to, selectively, record on the tape or wire, or transcribe or erase therefrom magnetic impressions corresponding to sound vibrations.

While the principles involved in, and the essential structural elements required for, magnetic recording are well known in the art, the utility and commercial success of prior art equipment of this type has been restricted, due largely to difficulties encountered and the care required incident to assembling and disassembling the reels of tape in operative relationship with the magnetic head for recordation and transcription. Steel tape of the type adapted for practical utility in magnetic recording apparatus must be very thin to provide the required flexibility, and particularly to obviate excessive bulk. Tape of this type, however, is also very frangible, and also, because of its tendency to coil when loose, is extremely difficult to handle.

It has been found that the most effective magnetic recording system is that which contemplates passing the magnetic field through the tape by pole pieces disposed on opposite sides of the tape, and the adjustment of the pole pieces in this form of recording is highly critical. This necessitates threading the tape of each successive reel to be used between the pole pieces, which operation is time consuming, with the ever present danger of breaking the tape as a result of careless handling.

It is a general object to provide a compact, portable and inexpensive magazine, structurally separate from the recording head and power mechanism, in which a quantity of steel tape is protectively enclosed, while permitting the impression of a magnetic record upon any reach of the tape or the transcription or erasure from the tape of any part of a previously-recorded magnetic pattern without removal of the tape from the magazine.

More specifically, an object hereof is to provide guide means for a pair of magnetic pole pieces, one of which comprises an integral part of the magazine in which the record medium is encased, whereby electrical or magnetic contact may be effected to energize the poles magnetically to opposite polarity and coincidentally critically position said poles at opposite sides of the recording medium for most effective recording and transcription.

Another object is to provide a magazine having a pair of tape reels journalled therein, to either of which power may be selectively applied for shifting the tape from one reel to the other, in combination with guide mechanism for directing a length of tape adjacent an opening in the magazine for operative engagement by an electromagnet, energized by a signal current, of a separate recording, transcribing or erasing unit with which the magazine may be releasably associated.

Another object hereof is to provide one or more pole pieces movable laterally relative to a plane in which the tape travels while being transferred from one reel to the other, the pole or poles being shifted into operative contact with the tape in response to resilient means actuated by an element of the recording unit with which the magazine is associated, for transcription or recordation or the erasure of a previously recorded signal from the tape.

Still another object is to provide brake mechanism for the spools to normally hold the reels against rotation so as to maintain taut the reach of the tape extending therebetween, and thus facilitate the assembly of the magazine with the recording unit, and particularly obviate any tendency toward snapping the tape when power is applied, the brake mechanism being automatically released incident to association of the magazine with the recording unit.

Other objects are the provision of an assembly wherein the relationship between the pole pieces and tape is effected automatically, the operator being required only to place the magazines in proper juxtaposition with the base of the recording unit, and further to provide inherent means for maintaining the requisite pressure of the pole pieces upon the tape during recordation and transcription, as well as simplicity of construction, economy of manufacture, and durability.

Figure 1:
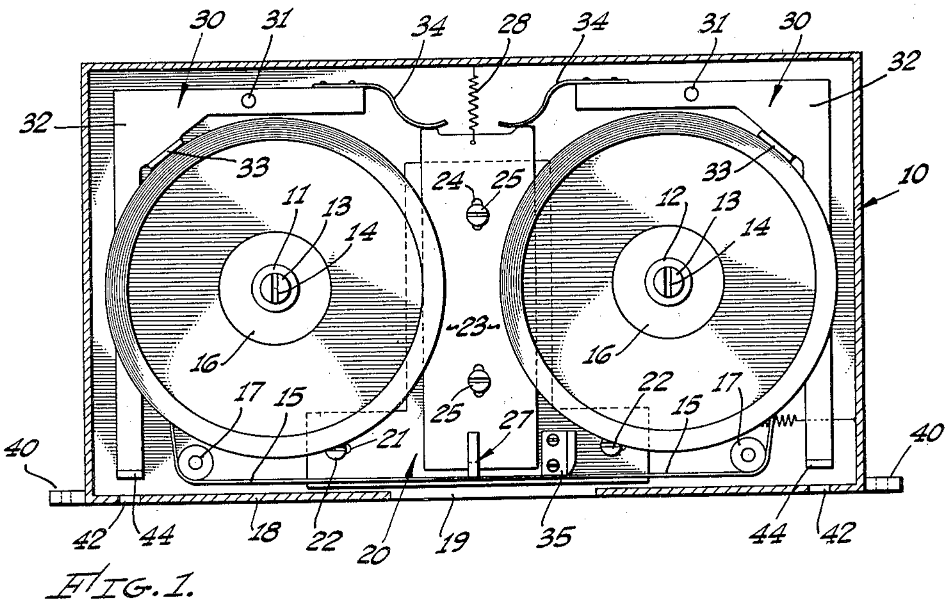
Fig. 1 is a longitudinal sectional view through the casing, illustrating the internal construction.

Referring to the drawings in detail, the numerals of which indicate similar parts throughout the several views, 10 designates a flat elongated casing rectangular in both longitudinal and transverse cross- section. A pair of spools 11 and 12 are mounted in opposite ends of casing 10 on a pair of spindles 13 journalled in opposed side walls of the casing. One side of casing 10 is provided with a pair of holes which are aligned, respectively, with spindles 13, the corresponding ends of which are formed with key-ways 14 for selective engagement by a drive shaft (not shown) associated with a recording unit hereinafter more in detail referred to. Thus, either of spools 11 and 12 may be driven to draw tape 15 from the other spool, which idles in response to tension upon the tape. Opposite ends of tape 15 are permanently attached to the hubs 16 of the respective spools 11 and 12 by means not shown. Suitable mechanism well known in the art may be incorporated within the magazine to limit the number of rotations of each of the spools so as to prevent fracture of tape 15 when the supply on either spool is exhausted. The length of tape 15 extending between the spools 11 and 12 passes over a pair of idler pulleys 17 journalled in close proximity to the bottom 18 of the case, so as to support the intermediate reach of tape closely adjacent the bottom 18 in which an elongated opening 19, equi-spaced from the ends of casing 10, is formed.

Figure 2:
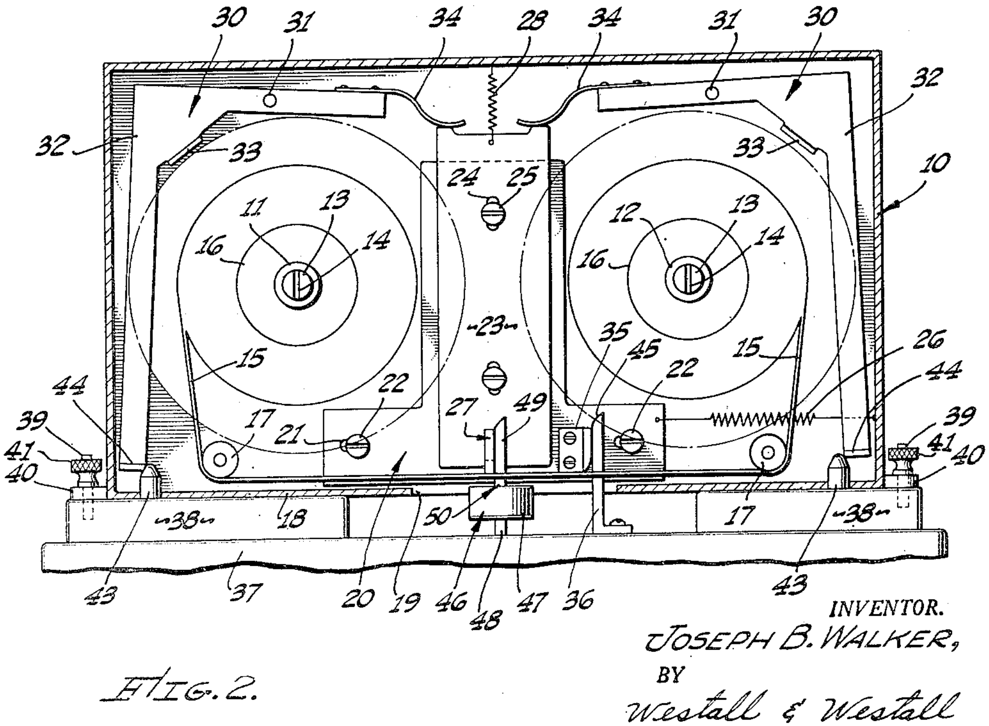
Fig. 2 is a sectional view similar to Fig. 1, depicting the magazine in operative relation with the base of a recording unit, and illustrating the position and function of the various parts of the magazine as affected by the recording unit.
Figure 3:
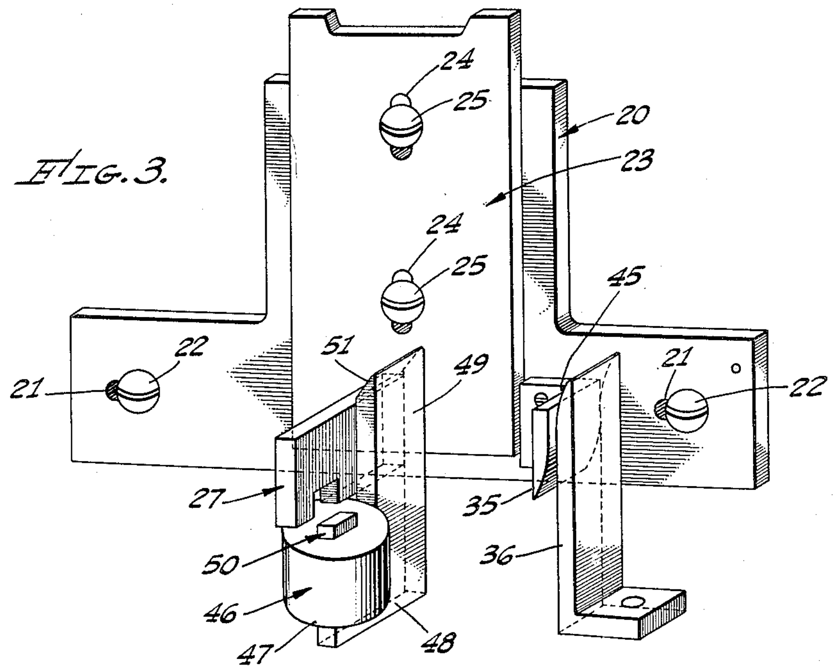
Fig. 3 is a perspective view of the pole piece assembly, and the support and guiding means therefor, carried by the magazine and recording base, respectively.

A generally T-shaped plate 20 is secured in inverted position by means about to be described on one side of casing 10 with the intersection of its elements disposed adjacent the opening 19 in bottom 18 of the casing. The lateral projections of plate 20 are each formed with a slot 21 through each of which a screw 22 extends. The slots 21 are in parallel relation, and screws 22 are threaded into the side wall of the casing so as to maintain plate 20 against vertical movement but permit slidable movement parallel to bottom 18 of the casing. Superimposed upon the vertical section of plate 20 is a second flat rectangular plate 23, formed with a pair of centrally-located slots 24 which are arranged parallel to the longitudinal axis of plate 23. The plates 20 and 23 are secured together against relative lateral movement by means of screws 25 projecting through slots 24 and threaded into plate 20. The T-shaped plate 20 and plate 23 carried thereby are normally drawn to the right as seen in Figs. 1 and 2 by a helical spring 26, having its ends connected between one end of casing 10 and plate 20.

A small flat iron bar 27, having one end secured to and preferably insulated from, the lower end of plate 23 projects laterally therefrom to the middle plane of the casing so as to overhang the reach of tape 15 disposed opposite the opening 19. Slots 24 in plate 23 through which the screws 25 extend are of a length sufficient to permit the pole piece 27 to contact tape 15 during operation and to be withdrawn from such engagement when the magazine is not associated with its recording unit. To this end a helical spring 28 is provided for connection between the upper end of plate 23 and the top of the casing, which normally suspends, resiliently, the plate 23 and its pole piece 27 in an elevated position. The lower edge of pole piece 27 is cut away adjacent its outer end to form, at the outer extremity of the pole, a tape contact 29 of the required size and shape. In each of the embodiments with the exception of that shown in Fig. 4, no coil is directly associated with the magazine pole piece, the latter being magnetically charged by a coil carried by the recording unit, as is hereinafter described.

Each of spools 11 and 12 is provided with brake mechanism comprising a flat angle 30 disposed in opposite upper corners of casing 10, opposite sides of each angle 30 being normally disposed substantially parallel with the top and adjacent end of the casing. The upper side of each angle 30 is pivoted on a pin 31 having its ends secured in the sides of the casing above the adjacent spool, whereby the angle 30, being offset laterally with respect to the spool, is free to pivot within the limits permitted by the end and top of the casing. Each angle 30 is formed with a web 32 having a laterally-projecting brake shoe 33 adapted to extend into the arc of the periphery of the adjacent spool when the lower end of angle 30 is swung toward the middle of the casing so as to frictionally engage the spool.

The upper side of each angle 30 is provided with an arcuate spring extension 34 which bears on the upper end of the vertically-sliding plate 23. With the magazine out of association with the recording unit, and with the plate 23 held in elevated position in response to the tension of spring 28, the angles 30 are maintained in a position with the laterally projecting brake shoe 33 in engagement with the spools 11 and 12, as seen in Fig. 1.

In order to assure proper alignment of the pole piece 27 with a pole piece later to be described carried by the recording unit, I provide an angle bracket 35 secured to the lower end of plate 20 at a point laterally offset with respect to plate 23. One side of bracket 35 projects outwardly from plate 20 for releasable engagement by an upstanding guide member 36 secured to the recording unit (see Fig. 2) about to be described.

The recording unit comprises a base 37 on which blocks 38 are secured in spaced relation for the support of casing 10 of the magazine. A bolt 39 projecting upwardly from each block 38 is adapted to engage in one of a pair of slotted lugs 40 carried by the respective ends of the casing 10. A knurled nut 41 for each of bolts 39 provides a means for clamping the magazine firmly onto base 37 in properly adjusted position. In order to further assure proper alignment of the magazine and recording unit, a pair of openings 42 are formed in opposite ends of bottom 18 of casing 10 to register with tapered dowel pins 43 mounted in the respective blocks 38 of base 37. The lower end of each of the brake-lever angles is formed with a laterally projecting foot 44 which normally extends over one of the openings 42 provided for the accommodation of the complementary dowel pin 43. Each of dowel pins 43 is of a length sufficient to engage one of feet 44 of the brake-lever angles 30 within the magazine incident to the operation of assembling the magazine upon the recording unit so as to displace the brake shoe 33 from the adjacent spool and permit rotation of the latter upon the application of power to the take-up spool. The tilting of the brake-lever angles 30 in response to lowering the magazine over the dowel pins 43 depresses the arcuate springs 34 attached to the upper sides of levers 30. The pressure exerted by the springs 34 on the upper end of plate 23 overcomes the tension of the helical spring 28 by which the plate is normally held in suspended position so as to lower the pole piece 27 of the magazine against the upper surface of tape 15.

The upper end of the guide member 36, mounted on base 37 intermediate blocks 38 and above generally alluded to, is beveled, as at 45, to engage the lower edge of the laterally-projecting side of the angle 35, which is normally held by spring 28 in a position where it will abut against the beveled end 45 of guide member 36 upon lowering of the casing over dowel pins 43. As the magazine is lowered onto base 37, bracket 35 is compelled to shift laterally, in response to the urge of the upper end of guide member 36, imparting this motion to plates 20 and 23 against the tension of spring 26. Continued downward movement of the magazine lowers the laterally-shifted angle bracket 35 on one side of the guide member 36 with which it is maintained in firm contact by spring 26. Thus pole piece 27 of the magazine carried by plate 23 is positively located in a predetermined position relative to guide member 36 and associated elements of the recording base 37.

Mounted on base 37 intermediate dowel pins 43 by suitable means is an axially vertical coil 46, having a core 47 adapted to project slightly above base 37 so as to contact the underside of tape 15 when the magazine is clamped in position. The lower end of core 47 is formed with a radial extension 48 from the outer end of which upwardly projects a contact element 49 terminating at a point considerably above coil 46 and pole piece 50 of opposite polarity projecting upwardly from coil 46. The upper end of contact element 49 is tapered as at 51 in the same manner as is the guide member 36 for engagement with pole piece 27 carried by the plate 23 of the magazine when the latter is assembled with the recording unit. Thus it will be seen that the upright contact element 49 performs initially the same function as guide member 36, i. e., of shifting plate 23 laterally within the magazine to properly align the pole pieces 27 and 50. As the contact element 49 is the same thickness as the pole piece 50, it will thus be observed that the two pole pieces, on opposite sides of the tape, are in offset relation, their opposite side surfaces lying in the same plane. As a result of the firm engagement between the contact element 49 and pole piece 27 incident to the tension of spring 26, the polarity of the lower end of core 47 of coil 46 is transmitted to the pole piece 27 within the magazine. Due to the offset relationship of the pole pieces 27 and 50 on opposite sides of tape 15, the magnetic field set up upon energization of coil 46 is confined to a small area of tape 15 between the opposed corners of the respective pole pieces, and objectionable magnetic flux is reduced to a minimum.

Windows (not shown) may be provided in either or both sides of casing 10 by which the operator may observe the amount of tape on each spool. Power may be transmitted to either of spools 11 or 12 through their spindles 13 by a flexible drive (not shown) from an appropriately located motor, or by any other conventional mechanism.

Figure 4:
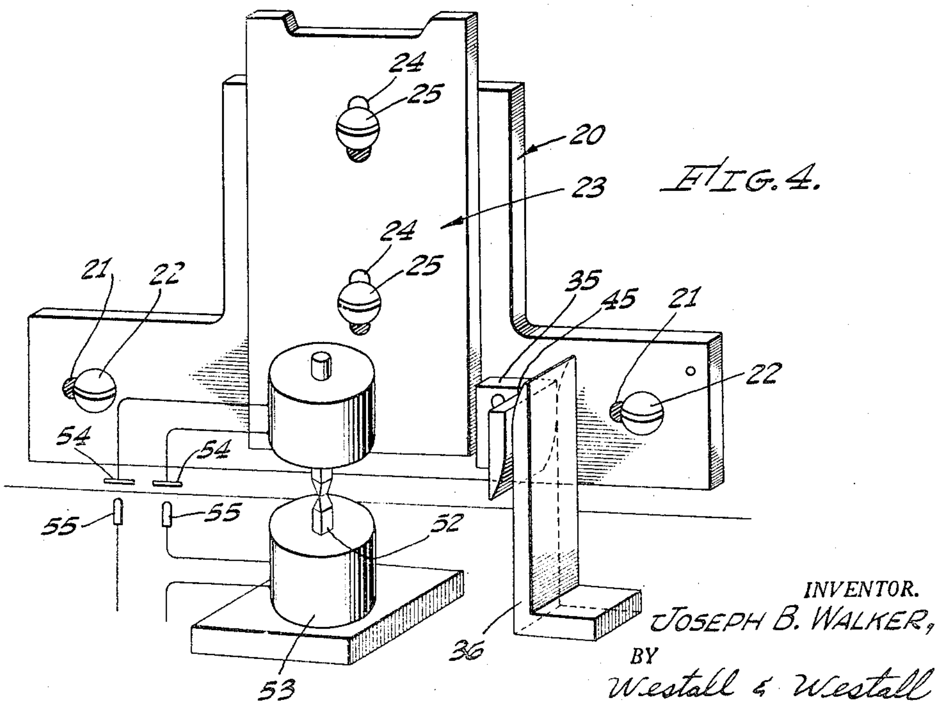
Fig. 4 is a perspective view, corresponding to that of Fig. 3, showing a modified form of pole piece assembly wherein two coils are employed.

In Fig. 4 I have illustrated a modified form of coil and pole piece assembly. In this embodiment each pole piece 52 is provided with a separate coil 53 which is secured by suitable means (not shown) to base 37 and plate 23 of the magazine respectively, whereby the pole pieces 52 are supported in direct opposition to one another at opposite sides of tape 15 when the magazine is assembled with the recording unit. To this end the guide member 36 and angle 35 are positioned to critically shift plates 20 and 23 and thereby effect the required juxtaposition of the pole pieces 52. The ends of the coil 53 within the magazine are connected to a pair of resilient contacts 54 suitably mounted to the bottom of casing 10 which are adapted to engage complementary contacts 55 carried by base 37 and connected to a source of electricity through the stationary coil 53 in an obvious manner.

Figure 5:
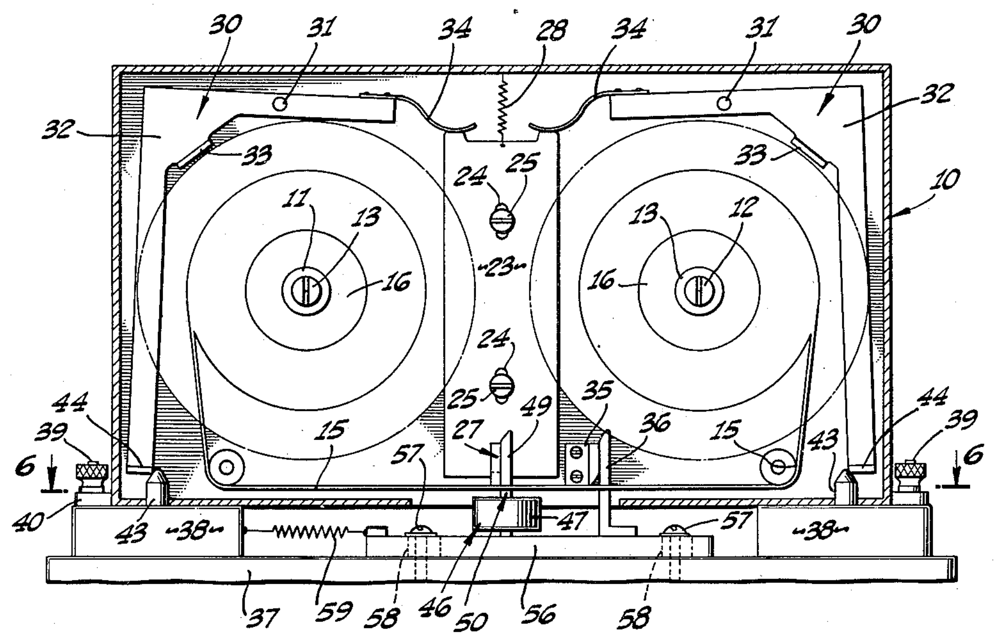
Fig. 5 is a sectional view through the casing of another simplified embodiment of magazine in operative relationship, with a recording base of different construction.
Figure 6:
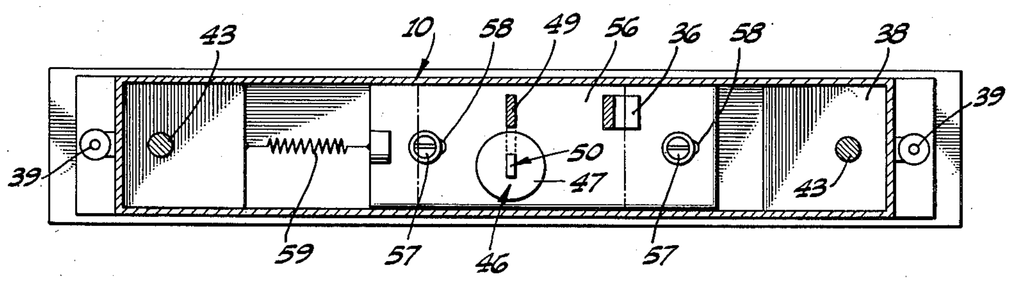
Fig. 6 is a sectional view taken on correspondingly-numbered lines of Fig. 5.

In Figs. 5 and 6 I have illustrated a simplified embodiment of the magazine of my invention, wherein the lateral movement of the magazine pole pieces 27 and 50 is dispensed with. A plate 23 is slidably carried directly by the side of the casing by screws 25 which extend through the vertically-aligned slots 24 in plate 23 and are threaded into the casing. In other particulars, the magazine is substantially the same as that hereinabove described. The recording unit with which the magazine of the embodiment shown in Fig. 5 is adapted to cooperate comprises a base 37 adjacent the ends of which blocks 38 are mounted for the support of the magazine when recording, transcription or erasure of a previously recorded magnetic pattern is desired. Between blocks 38 a slidable carrier 56 is superimposed upon supporting base 37 being connected thereto by screws 57 extending through slots 58 in carrier 56 which limit the degree of movement of the carrier and confine the direction of that movement to a plane parallel with the magazine when the latter is connected to the base. A helical spring 59 has its ends connected to carrier 56 and to one of blocks 38 so as to normally maintain carrier 56 at one end of its range of movement. The guide member 36 adapted to engage angle bracket 35 which, in the embodiment under consideration, is secured directly to the side of casing 10 rather than to a plate 20, which is omitted in this embodiment, is mounted on carrier 56 by suitable means not shown. The coil assembly 46 illustrated in Fig. 2 is mounted on carrier 56 and has associated therewith a contact element 49 for transmitting the magnetic energy from the lower end of core 47 of the coil to pole piece 27 of the magazine. With the carrier 56 disposed at the end of its range of movement, as limited by the screws 57, in response to the tension of spring 59, the contact element 49 of the coil 46 and the guide member 36 will be only slightly misaligned in the opposite direction with respect to pole piece 27 of the magazine and angle bracket 35 respectively, when the magazine is in position for lowering onto dowel pins 43. As the upper ends of contact element 49 and guide member 36 are beveled on the side opposite to which the carrier may be moved against the tension of the spring 59, continued lowering of the magazine onto base 37 compels carrier 56 to shift and complete the misalignment of guide member 36 and contact element 49 with their respective complementary parts of the magazine. The tension of spring 59, however, maintains an effective contact between the element 49 and upper pole piece 27, assuring the operator that by merely clamping the magazine to the base the pole pieces 27 and 50 of the recording unit and magazine, respectively, will be properly positioned and in contact with tape 15. As in the embodiment of Figs. 1–4, the brake mechanism for spools 11 and 12 is released by dowel pins 43 coincident with the assembly of the magazine with the recording base for operation.

It will thus be seen that I have provided a compact, magnetic recording unit comprising a magazine of novel construction capable of quick assembly and disassembly with the recording base whereby any reach of the tape or wire, permanently and protectively housed within the magazine, may be brought into contact with the recording head for recordation or transcription without the necessity of threading the tape between the pole pieces of the magnets and completely obviating all manual adjustment of the recording mechanism preliminary to actual recordation, transcription, or the erasure of a previously recorded signal.

While only a single composite recording head is disclosed in each of the three embodiments, it will be appreciated that separate erasing magnets may be associated with the magazine and recording unit, in precisely the same manner as are the coil assembly and pole pieces of any of the several structures for actuation in the same manner, without specific illustration or further description.

In the foregoing description and in the following claims, the term "recording," except where otherwise indicated, is employed to designate "transcribing" and "erasing" as well, and, correspondingly, in those claims contemplating a single coil assembly and/or tape or recording medium, the language is to be interpreted as capable of recordation, transcription or erasure of a magnetic pattern upon either a tape or wire.

The several embodiments shown in the drawings and hereinabove described being merely illustrative of my invention, it will be understood that numerous changes in size, design, shape, number and proportion of the parts may be made, that in each of the embodiments with the exception of that shown in Fig. 4, the guide member 36 and angle bracket 35 may be omitted if desired, and that in each of the embodiments the mechanism by which the pole piece within the magazine is displaced from the tape upon disassociation of the magazine from the recording unit, may be omitted, whereby the pole piece will remain in contact with the inner surface of the tape at all times, all without departing from the spirit of my invention as defined in the appended claims.

What I claim and desire to secure by Letters Patent is:

1. In apparatus of the character described, a magazine having an opening therein, a pair of spools journalled within said magazine at opposite sides, respectively, of said opening for carrying a recording medium therebetween, guide means to retain a reach of said recording medium adjacent said opening, a pole piece within said magazine in contact with said recording medium, a recording unit comprising a pole piece disposed exteriorly of said magazine, and means to operatively position said pole pieces on opposite sides of the recording medium operable incident to positioning said magazine on said recording unit.

2. In apparatus of the character described, a magazine having an opening therein, means within said magazine to support and move a recording medium adjacent said opening, a pole piece within said magazine movable into contact with one side of said recording medium, a recording unit disposed exteriorly of the magazine comprising a second pole piece, and guide means carried by said magazine and recording unit adapted upon assembly of the magazine and recording unit to position said second pole piece in contact with an opposite side of said recording medium in operative opposition to said first pole piece, and means carried by said magazine and recording unit operable upon actuation of said guide means to shift said first-named pole piece into contact with said recording medium.

3. In apparatus of the character described, a magazine having an opening therein, means within said magazine to support and move a recording medium adjacent said opening, a pole piece within said magazine to contact one side of the recording medium, a recording unit disposed exteriorly of the magazine comprising a second pole piece, guide means carried by said magazine and recording unit adapted for engagement upon assembly of the magazine and recording unit to operatively juxtapose said second pole in contact with the opposite side of said recording medium, and means to energize the pole piece in said magazine operable coincident with the association of the magazine and recording unit.

4. In apparatus of the character described, a magazine having an opening therein, a recording medium, means to move said recording medium within said magazine adjacent said opening, a pole piece within said magazine, a base for supporting said magazine, a second pole piece carried by said base, and means operable in response to positioning said magazine upon said base to shift said pole pieces relative to one another for operative juxtaposition with said recording medium.

5. In apparatus of the character described, a magazine having an opening therein, a recording medium within said magazine movable adjacent said opening, a pole piece within said magazine in contact with one surface of the recording medium, a base, a second pole piece carried by said base, means to mount said magazine on said base, and means to shift said second pole piece longitudinally of the recording medium incident to mounting said magazine upon said base.

6. In apparatus of the character described, a magazine having an opening therein, a recording medium within said magazine movable adjacent said opening, a pole piece within said magazine in contact with one surface of the recording medium, a base, a second pole piece carried by said base, means to mount said magazine on said base, a coil encircling said second pole piece, and means to connect one end of said second pole piece to said first pole piece to magnetically charge the latter, said last-named means being operable in response to assembly of said magazine on said base.

7. In apparatus of the character described, a magazine, a recording medium within said magazine, a pole piece within said magazine in contact with said recording medium, a base, a pole piece carried by said base, guide means associated with said base and magazine, respectively, to retain said magazine in a predetermined position with respect to said base, and means to shift said pole pieces relative to one another to operatively position said pole pieces with respect to one another and said recording medium, said last-named means being operable incident to engagement of said guide means.

JOSEPH B. WALKER.

REFERENCES CITED

The following references are of record in the file of this patent:

UNITED STATES PATENTS

| Number | Name | Date |
|---|---|---|
| 1,237,496 | Funkhauser | Aug. 21, 1917 |
| 1,799,795 | Horton | Apr. 7, 1931 |
| 2,058,399 | Begun | Oct. 27, 1936 |
| 2,321,812 | Heller | June 15, 1943 |
| 2,353,044 | Kriegsheim | July 4, 1944 |
| 2,359,617 | Bryce | Oct. 3, 1944 |
| 2,364,556 | Somers | Dec. 5, 1944 |

FOREIGN PATENTS

| Number | Country | Date |
|---|---|---|
| 584,276 | Germany | Sept. 16, 1933 |